(12) United States Patent
Khusro

(10) Patent No.: US 6,329,007 B1
(45) Date of Patent: Dec. 11, 2001

(54) FLAT BREAD GRILL

(76) Inventor: Andy Khusro, 14210 Mandely Dr., Houston, TX (US) 77077

( * ) Notice: Subject to any disclaimer, the term of this patent is extended or adjusted under 35 U.S.C. 154(b) by 0 days.

(21) Appl. No.: 09/480,612

(22) Filed: Jan. 10, 2000

(51) Int. Cl.$^7$ .................................................. A21D 6/00
(52) U.S. Cl. ........................... 426/502; 426/505; 99/353; 99/423; 99/427; 425/87; 425/218; 425/458; 222/168
(58) Field of Search ............................... 99/353, 423, 422, 99/427; 426/523, 502, 505; 425/318, 87, 458, 218; 222/168, 342

(56) References Cited

U.S. PATENT DOCUMENTS

| | | | |
|---|---|---|---|
| 825,849 | * | 7/1906 | Lohmann . |
| 2,186,335 | * | 1/1940 | Halpern .................................. 107/19 |
| 2,579,258 | | 12/1951 | Heckert .................................. 99/349 |
| 2,613,977 | | 10/1952 | Kellogg ..................................... 294/1 |
| 2,667,829 | | 2/1954 | McNutt .................................. 99/429 |
| 2,862,754 | | 12/1958 | Forcia et al. .............................. 294/1 |
| 3,451,359 | * | 6/1969 | Glasgow ................................ 107/47 |
| 3,716,319 | * | 2/1973 | Norman ................................ 425/293 |
| 3,734,674 | * | 5/1973 | Steele .................................... 425/458 |
| 3,736,088 | * | 5/1973 | Jimenez ................................ 425/218 |
| 4,040,734 | * | 8/1977 | Glasgow ................................ 425/218 |
| 4,226,579 | * | 10/1980 | Glasgow ................................ 425/218 |
| 4,664,025 | * | 5/1987 | Martinez ................................ 99/331 |
| 5,667,821 | | 9/1997 | Castaneda .............................. 425/218 |
| 5,752,432 | * | 5/1998 | Burchfield .............................. 99/426 |
| 5,964,144 | * | 10/1999 | Chapa .................................... 99/351 |
| 6,089,144 | * | 7/2000 | Garber et al. .......................... 99/331 |

* cited by examiner

*Primary Examiner*—Keith Hendricks
*Assistant Examiner*—Drew Becker
(74) *Attorney, Agent, or Firm*—Russell J. Egan

(57) ABSTRACT

A flat bread grill has a grill formed by a housing enclosing a controllable heating element and is topped by a round, flat grill surface, which is preferably coated with a non-stick substance, and has an annular channel or recess adjacent the periphery thereof. A dough or batter spreader has an elongated pentagonal shape with a rounded pointy inner end, diverging side walls, substantially parallel side walls, and an arcuate outer wall. The inner end has an integral depending foot while to outer arcuate wall has both an upwardly directed handle and a depending arcuate foot which is readily received in the annular channel or recess of the grill. The one pair of diverging and side walls have a lesser depth than other pair of diverging and sidewalls. The spreader is held spaced above the grill surface by both feet. Preferably the volume of the pentagonal spreader member is substantially equal to that of a single piece of thin flat bread produced by the subject invention.

9 Claims, 4 Drawing Sheets

FLAT BREAD GRILL

BACKGROUND OF THE INVENTION

1. The Field of the Invention

The present invention concerns a grill for baking flat bread and, in particular, to a means and method for making thin, round, flat bread of uniform thickness and without holes or voids.

2. The Prior Art

Bread can be said to be, and almost is, a universal food stuff with every culture having a style of bread with a flat, thin, round shape. This may be variously called, for example, a pancake, a tortilla, a crepe, or a dosa. In each case the thin, flat, round bread is used as a wrapper to enclose other food making up the meal. Because of this intended use, there has been the problem of making the bread, particularly the thinner fried varieties, with uniform thickness and without holes. The uniform thickness is necessary to make the bread easy to roll or fold and the need for an absence of holes is quite obvious. Sometimes the dough or batter is made fairly stiff and is hand patted into shape, i.e., tortillas. Sometimes the dough or batter is made fairly liquid and it is poured or dipped onto a hot surface without any assurance that the resulting bread will either be of uniform thickness and/or without holes.

The present invention overcomes all of the above discussed problems by providing a method and device for producing thin, flat, round bread of uniform thickness and without holes. The present invention enables making of such bread in a rapid and convenient manner by even the most unskilled of bakers.

SUMMARY OF THE INVENTION

The present flat bread grill invention has a grill containing a heat source and a spreader for applying the dough or batter to the surface of the grill in such manner as to assure production of uniformly thin, flat, round bread. The grill has a housing enclosing a heat source, preferably a controllable electrical heating element, and is topped by a round, flat grill surface. Preferably the grill surface is coated with a non-stick substance, such as Teflon, and is provided with an annular channel or recess adjacent the periphery thereof The spreader is an integral member having an elongated pentagonal shape with a rounded, pointy, inner end, a pair of diverging side walls, a pair of substantially parallel side walls, and an arcuate outer wall. One of the diverging walls and the adjacent parallel wall forms a leading edge while the like opposite walls form a trailing edge. The inner end has an integral depending foot while the outer arcuate wall has both an upwardly directed handle and a depending arcuate foot which is readily received in the annular channel or recess of the grill. The overall length of the spreader is slightly greater than the radius of the grill surface. The leading edge walls have a lesser depth than trailing edge walls. The spreader is held spaced above the grill surface by both feet. Preferably the volume of the pentagonal spreader is substantially equal to that of a single piece of the thin, round, flat bread produced by the subject inventions After the spreader is filled with dough or batter, it is rotated, preferably in a clockwise manner (or in the direction of the leading edge) with the dough or batter flowing from under the trailing edge which screeds the dough or batter smoothly and uniformly on the grill surface. The leading edge clears the deposited dough of batter at the completion of the rotation of the spreader.

BRIEF DESCRIPTION OF THE DRAWINGS

The present invention will now be described, by way of example, with reference to the accompanying drawings in which.

DETAILED DESCRIPTION OF AN EMBODIMENT OF THE INVENTION

Figure 1:
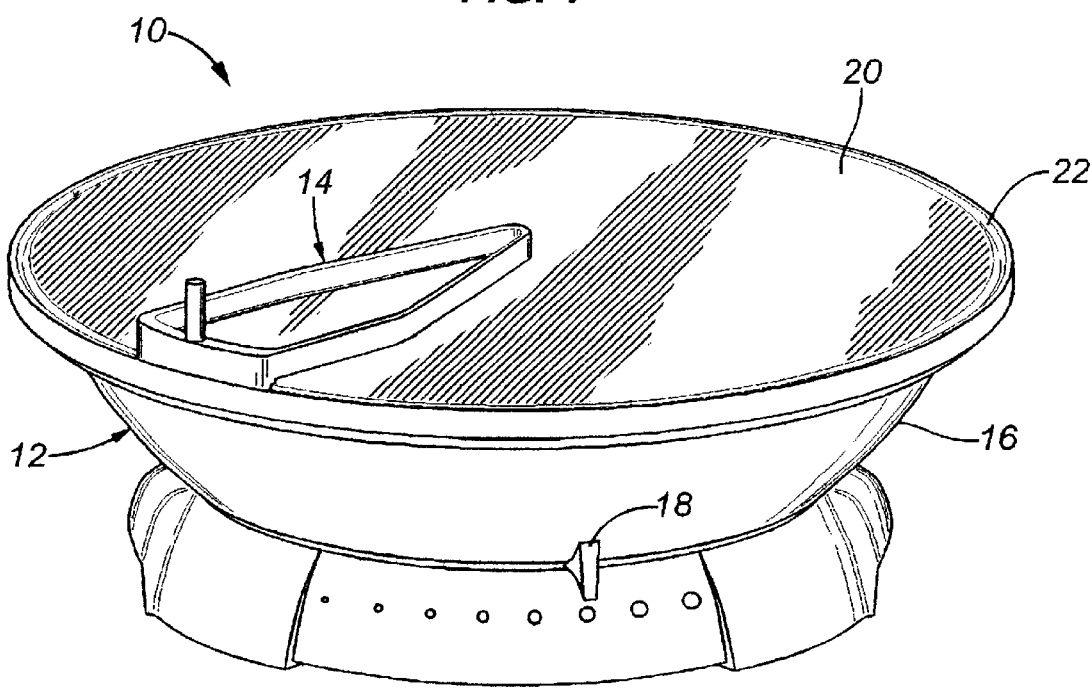
FIG. 1 is a perspective view of the subject invention.
Figure 7:
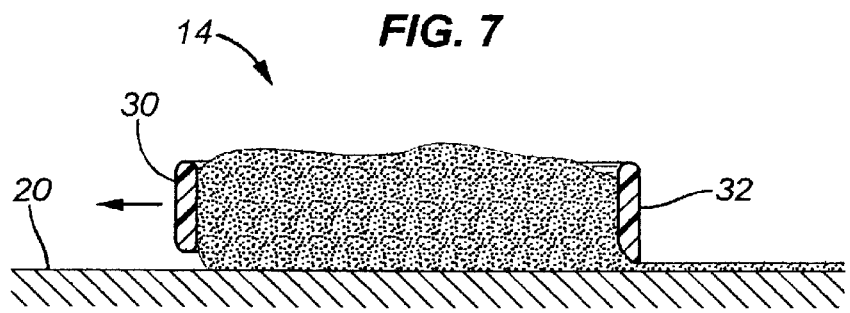
FIG. 7 is a diagrammatic transverse section showing the operation of the subject invention.
Figure 2:
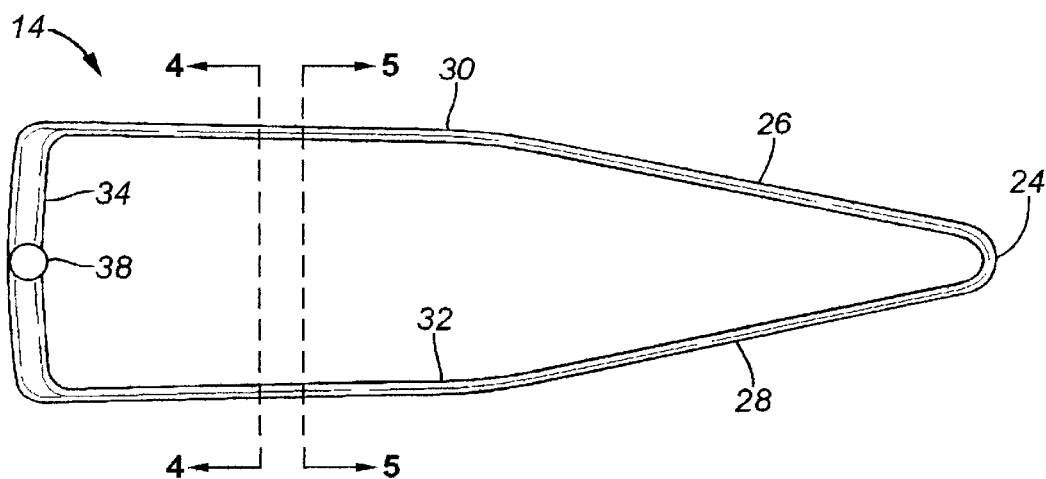
FIG. 2 is a top plan view of the spreader according to the present invention.
Figure 3:
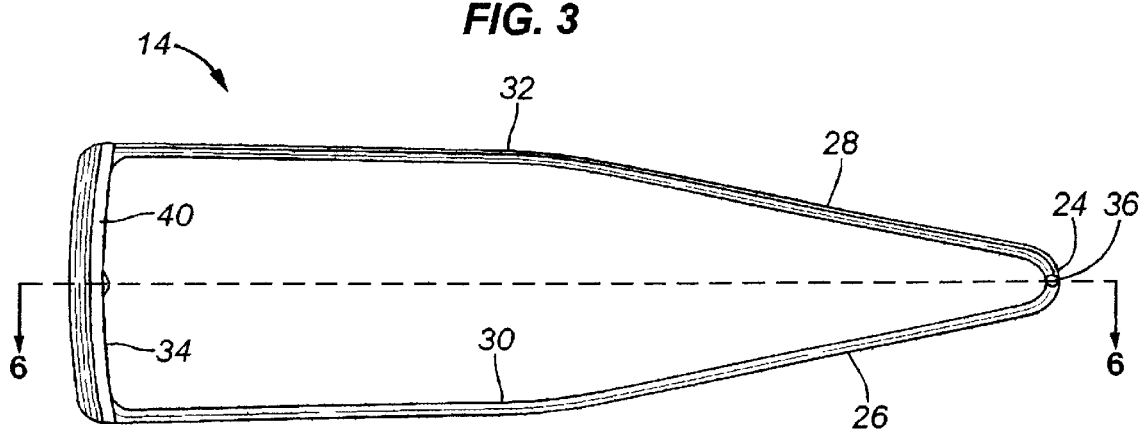
FIG. 3 is a bottom plan view of the spreader of FIG. 2.
Figure 4:
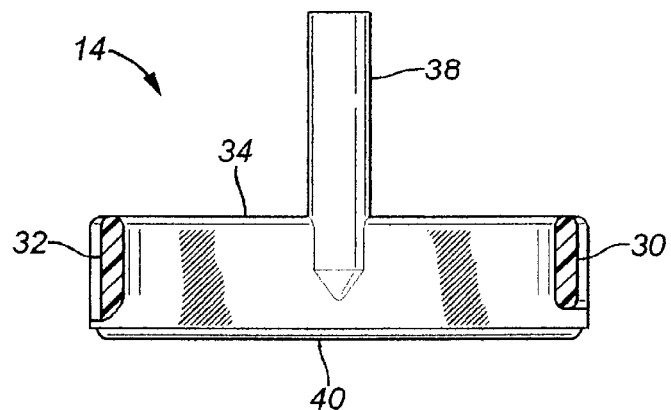
FIG. 4 is a transverse section taken along line 4—4 of FIG. 2.
Figure 5:
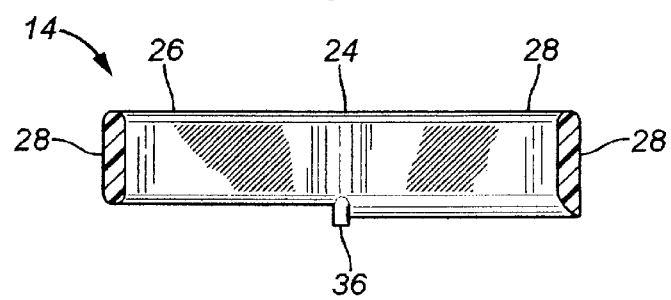
FIG. 5 is a transverse section taken along line 5—5 of FIG. 2.
Figure 6:
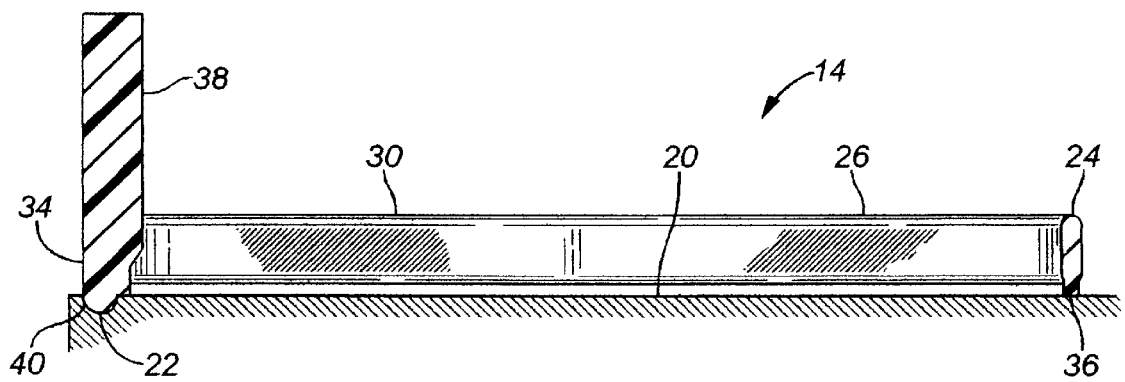
FIG. 6 is a longitudinal section taken along line 6—6 of FIG. 3.
Figure 8:
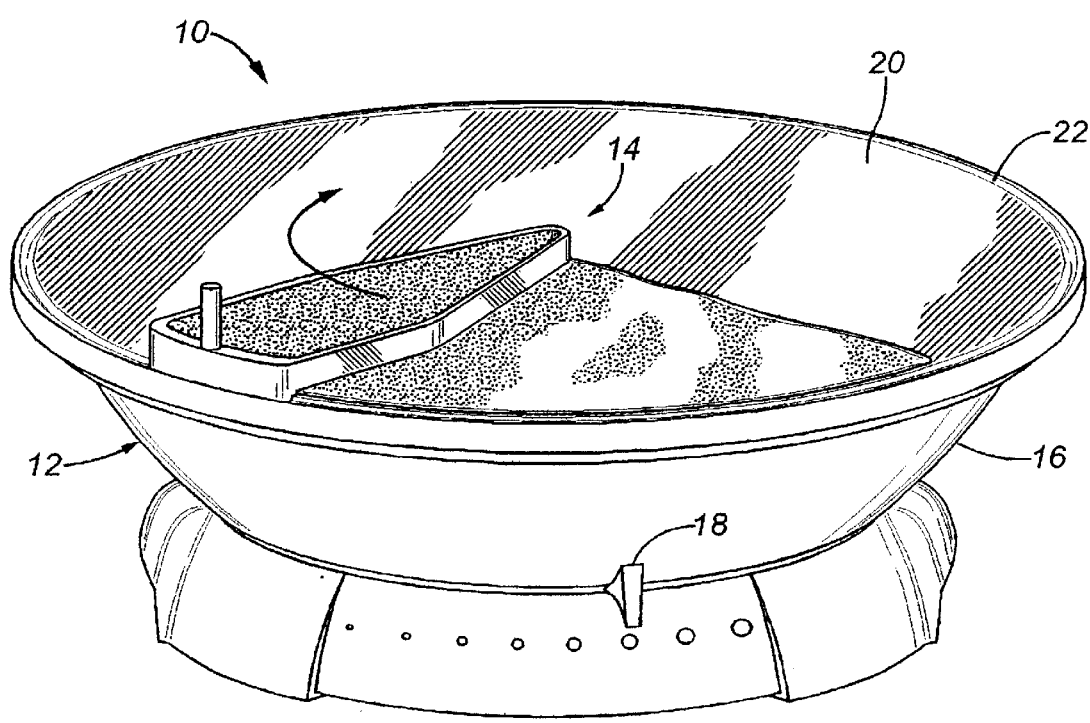
FIG. 8 is a perspective view, similar to FIG. 1, showing the spreader in the act of spreading left the dough on the grill surface.

The present flat bread grill invention 10 has a grill 12 and a dough or batter spreader 14. The grill has a housing 16 enclosing a heating element, preferably a known controllable electrical heating unit (not shown) with an exposed heat control 18, and a round, flat grill surface 20, preferably coated with a non-stick substance, such as Teflon, and an annular channel or recess 22 adjacent the periphery thereof The spreader 14 has an elongated pentagonal shape with a rounded pointy inner end 24, a pair of diverging side walls 26, 28, a pair of substantially parallel side walls 30, 32 and an arcuate outer wall 34. Walls 26, 30 form a leading edge for the spreader and walls 28,32 form the trailing edge for the spreader. The inner end 24 has an integral depending foot 36 while to outer arcuate wall 34 has both an integral upwardly directed handle 38 and a downwardly directed arcuate foot 40, which is readily received in the annular recess 22 of the grill 12. The leading walls 26 and 30 have a lesser depth than trailing walls 28 and 32 and all four walls are held spaced above the grill surface by the feet 36 and 40, as best appreciated from FIGS. 6 and 7. The overall length of the spreader is slightly greater than the radius of the grill surface. Preferably the volume of the pentagonal spreader member 14 is substantially equal to that of a single piece of thin flat bread produced by the subject invention.

The present invention is used by first heating the grill while preparing the dough or batter. When all is ready, the spreader 14 is placed on the grill surface 20 with the arcuate foot 40 engaging in groove 22 and the foot 36 lying in approximately the center of the grill. A measure of dough or batter is poured into the spreader 14 which is then rotated, in this case in a clockwise direction, to evenly spread the dough or batter over the surface of the grill. Since both the leading and trailing walls of the spreader are slightly spaced above the surface of the grill by feet 36, 40, and the dough or batter is fairly fluent, the dough or batter will flow out under the leading and trailing walls. As the spreader is rotated about the grill, in a clockwise direction as shown, the foot 36 remains substantially in the center of the grill and the arcuate foot 40 rides in the annular groove or recess 22 to make this rotating movement easy to accomplish. The trailing walls 28 and 32 serve to screed the dough or batter forming a uniformly thin layer of dough or batter on the grill surface. Since the spreader 14 holds an amount of batter substantially equal to that of a single piece of thin, round, flat bread produced by the invention, the dough or batter should last for one single compete rotation of the spreader on the grill surface. The leading walls of the spreader are shorter than the trailing walls so they will clear the initially laid down dough or batter as the spreader completes the circuit The spreader is removed and the dough or batter flows into the small area where the foot 36 of the spreader touched the center of the grill surface. When the bread has cooked sufficiently on one side, a spatula type utensil (not shown) is used to reverse it for grilling on the second side.

While the present invention is preferably heated with a conventional electrical heating unit, any other heat source, such as canned petroleum jelly or alcohol fueled heaters could be used to make the unit completely portable for traveling, picnics and camping.

The present invention may be subject to many modifications and changes without departing from the spirit or essential characteristics thereof The present embodiment is therefor to be considered in all respects as being illustrative and not restrictive of the scope of the invention as defined by the appended claims.

I claim:

1. A flat bread grill for cooking flat bread comprising:

said grill having a flat, round grilling surface and containing a heat source for heating said grilling surface; and spreader means for applying dough or batter to the grilling surface, said spreader means comprising a unity member having an elongated pentagonal shape formed by a first pair of converging side walls defining an inner end at their point of convergence, a second pair of substantially parallel side walls, and an arcuate outer wall one of the first pair of converging walls and the adjacent parallel wall forming a leading edge of the spreader while the like opposite converging wall and the adjacent parallel wall form a trailing edge of said spreader, the walls forming said leading edge having a lesser depth than the walls forming said trailing edge, whereby said spreader means applies dough or batter to the grilling surface in such manner as to assure production of uniformly thin, flat, round bread.

2. The flat bread grill according to claim 1 wherein:

said heat source is a controllable electrical heating element.

3. The flat bread grill according to claim 1 further comprising:

an annular channel or recess adjacent the periphery of said grilling surface.

4. The flat bread grill according to claim 1 further comprising:

a non-stick coating on said grilling surface.

5. The flat bread grill according to claim 1 further comprising integral foot depending from said inner end.

6. The flat bread grill according to claim 1 further comprising upwardly directed handle and a depending arcuate foot integral with said arcuate outer wall, said arcuate foot being readily received in an annular channel or recess of the grill.

7. The flat bread grill according to claim 1 wherein said spreader has an overall length slightly greater than the radius of the grill surface.

8. The flat bread grill according to claim 1 wherein said spreader defines a volume substantially equal to that of a single piece of thin, round, flat bread to be produced.

9. A method for producing thin, flat, round bread of uniform thickness and without holes, comprising the steps of providing a grill having a flat, round grilling surface and containing a heat source for heating said grilling surface with an annular channel or recess adjacent the periphery of said grilling surface; and providing a spreader for applying dough or batter to the grilling surface in such manner as to assure production of uniformly thin, flat, round bread, said spreader having an elongated pentagonal shape formed by a first pair of converging side walls forming an inner end, a second pair of substantially parallel side walls, and an arcuate outer wall, one of said pair of diverging walls and the adjacent parallel wall form a leading edge of the spreader while the like opposite walls of said pairs of walls form a leading edge of said spreader, an foot depending from said inner end and an upwardly directed handle and a depending arcuate foot with said arcuate outer wall, said arcuate foot being readily received in said annular channel or recess of the grill;

placing said spreader on said grill surface with said arcuate foot in said peripheral recess;

substantially filling the volume defined by said spreader with dough or batter;

using said handle to rotate said spreader one full rotation about said grill surface whereby said dough or batter will be uniformly deposited on said grill surface for cooking.

* * * * *